United States Patent [19]

Colbachini

[11] Patent Number: 4,701,119
[45] Date of Patent: Oct. 20, 1987

[54] APPARATUS FOR UNWRAPPING AND REMOVAL OF RUBBER TUBES

[76] Inventor: Giuseppe A. Colbachini, Via Fossona, 77, 35030 Cervarese S. Croce (Padova), Italy

[21] Appl. No.: 927,741

[22] Filed: Nov. 5, 1986

[30] Foreign Application Priority Data

Nov. 20, 1985 [IT] Italy .................... 22907 A/85

[51] Int. Cl.⁴ .............. B29C 35/00; B29C 43/50; B29C 41/42
[52] U.S. Cl. .................. 425/436 R; 156/149; 156/344; 156/584; 264/334
[58] Field of Search ............ 425/436 R, 392, 340, 425/343, 385, 397, 162, 502; 264/236, 347, 334; 156/149, 344, 584; 414/14, 20

[56] References Cited

U.S. PATENT DOCUMENTS

| 1,730,639 | 10/1929 | Blaker | 264/347 |
| 1,946,226 | 2/1934 | Wallace | 425/392 |

FOREIGN PATENT DOCUMENTS

| 49-14135 | 4/1974 | Japan | 425/392 |
| 0174338 | 10/1984 | Japan | 264/236 |

Primary Examiner—Willard E. Hoag
Attorney, Agent, or Firm—Bucknam and Archer

[57] ABSTRACT

Combined apparatus for performing the processes to which a rubber tube formed on a metal core must necessarily be subjected to after having been vulcanized comprises a bed constituted by a series of conveyor belts disposed in longitudinal sequence in a horizontal plane, onto which the tubes are individually placed after vulcanization. Along one side of the bed a carriage carrying a spool can be moved with the spool being driven to rotate by a slipping motor. At the two ends of the bed there are positioned header having forks for attachment to the cores on which the tubes are formed. By rotating the spool and simultaneously moving the carriage it is possible to unwrap and recover bindings from tubes of any diameter tidily, while by fixing one end of the metal core to one of the said headers and operating the said conveyor belts, the of finished tube can be released from the associated core.

6 Claims, 5 Drawing Figures

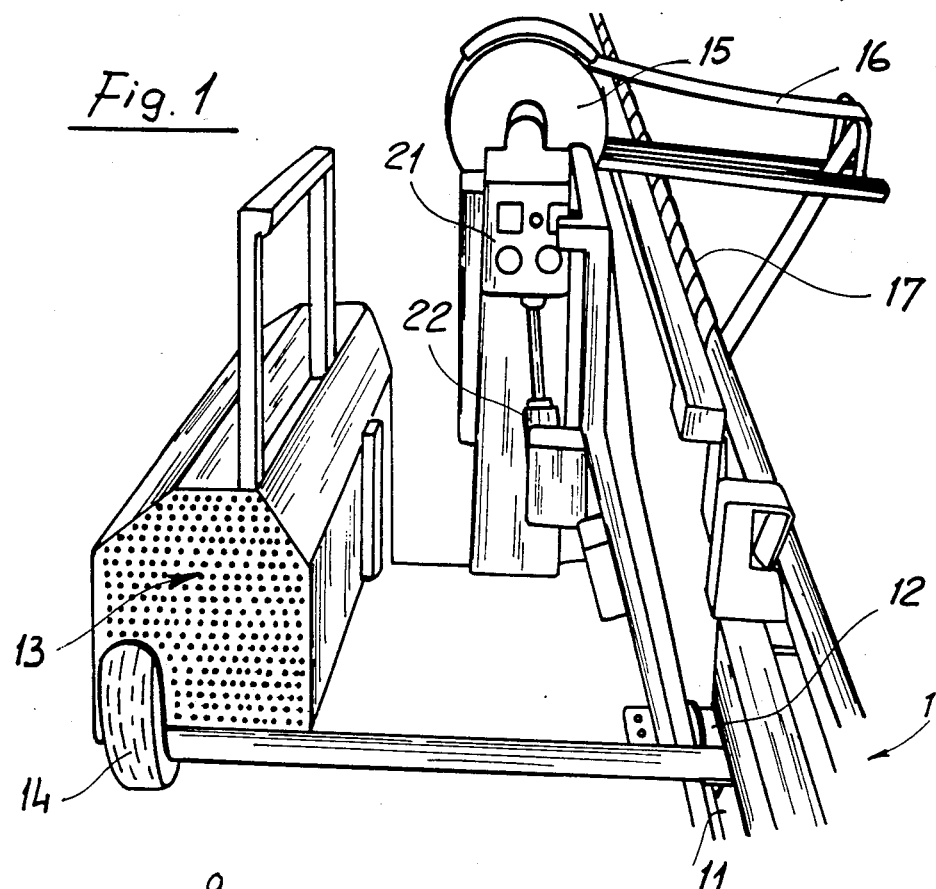
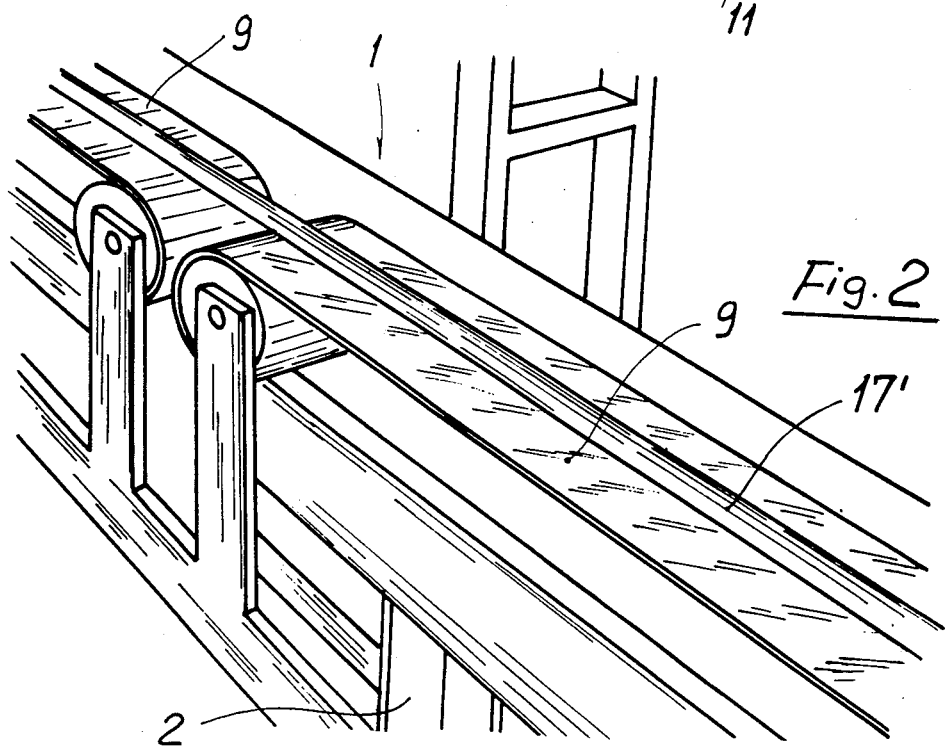

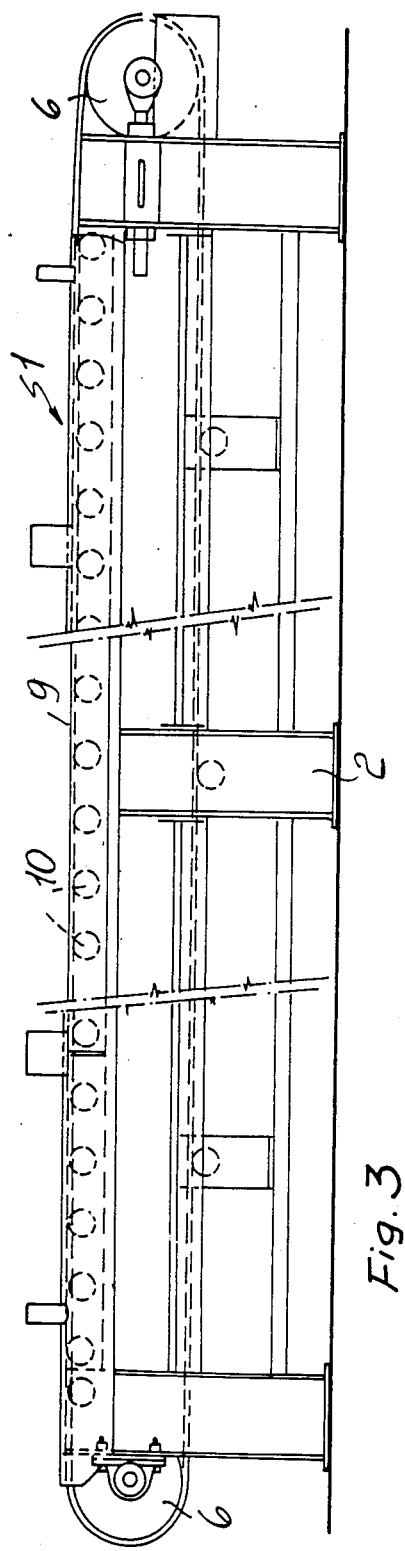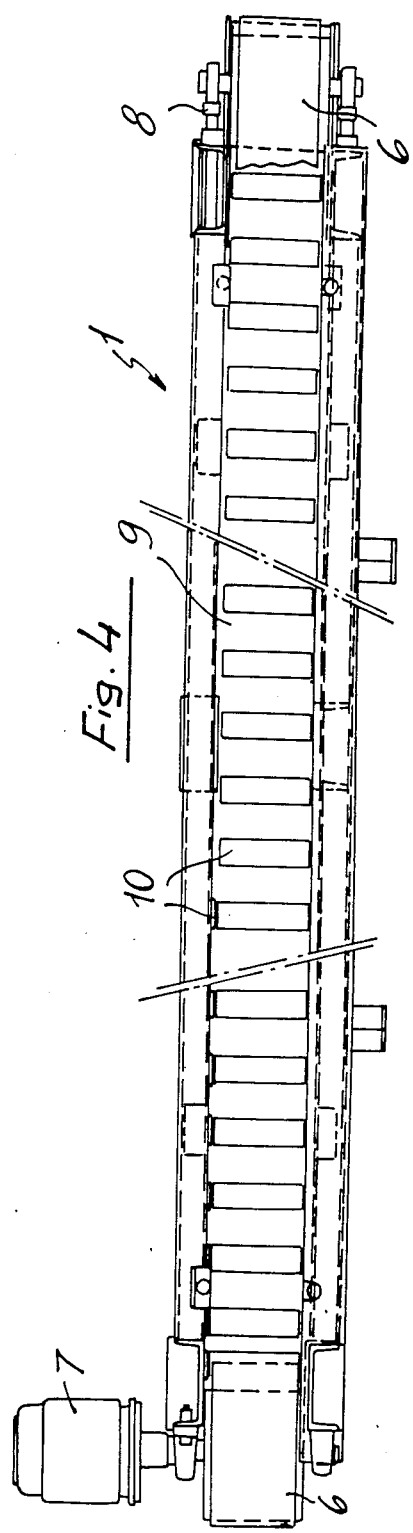

APPARATUS FOR UNWRAPPING AND REMOVAL OF RUBBER TUBES

BACKGROUND OF THE INVENTION

Installations for the production of rubber tubes of a predetermined length comprise a pair of rotary heads to which are fixed the end of cores constituted by round bars and supported along their horizontal length by a plurality of fixed stands mounted on an appropriate supporting structure or bed. Tubes formed on such cores using a process of known type must necessarily be subjected to a vulcanisation process which generally requires a preliminary wrapping or "bandaging" of the tubes by a binding, strip, cord or the like according to different requirements.

After vulcanisation of the rubber the tubes, now constituting the finished product, must be removed from the associated forming core after removal, when present, of the said binding.

Currently, the unbinding of the finished tubes—that is, when these have been clad with a binding or strip or the like before vulcanisation—is effected manually. This involves a significant use of manual labour with a consequent increase in the cost of production and with the possibility of breakage of the cladding strip because of the more or less marked adherence of this latter onto the tube; in any case this procedure makes the possible reutilisation of the bandage itself problematical. Moreover, there have not until now been provided convenient devices operable to simplify the operation of releasing the finished tube from the associated metal forming core. This releasing operation, on the other hand, involves significant practical difficulties when the tube to be released has a length exceeding determined limits.

OBJECTS OF THE INVENTION

The primary object of the present invention is to overcome the disadvantages of the prior art by providing a combined apparatus for the unwrapping and removal of rubber tubes made on a metal core, after vulcanisation thereof, which allows any cladding which has been wound on the tubes to be removed in a substantially automatic manner.

Another object of the present invention is to provide combined apparatus for the unbinding and removal of rubber tubes made on metal cores, after vulcanisation thereof, which permits the binding or strip removed from the tube to be collected in an orderly way so as to allow subsequent reutilisation thereof.

A further object of the present invention is to provide combined apparatus for the unbinding and removal of rubber tubes made on a metal core, after vulcanisation thereof, which is able to separate tubes of any length easily from the metal core on which they are made.

SUMMARY OF THE INVENTION

Combined apparatus for the unbinding and removal of rubber tubes formed on metal cores, after vulcanisation thereof, characterised comprises a bed constituted by a series of conveyor belts arranged in sequence in a horizontal plane to receive the tubes after vulcanisation, a header at each end of the bed, a carriage carrying a spool movable along one side of the bed and a drive motor for driving the spool via a transmission means allowing slippage of the drive.

Various other features and advantages of the present invention will become more clearly apparent from a study of the following description in which reference is made to the accompanying drawings, provided purely by way of non limitative example.

BRIEF DESCRIPTION OF THE DRAWINGS

FIG. 1 is a schematic perspective view of a carriage for the unbinding of tubes formed on a core.

FIG. 2 is a perspective view of a portion of a conveyor belt bed;

FIG. 3 is a partial side elevation of one of the said conveyor belts;

FIG. 4 is a plan view of the conveyor belt shown in FIG. 3; and

DESCRIPTION OF THE PREFERRED EMBODIMENTS

Figure 5:
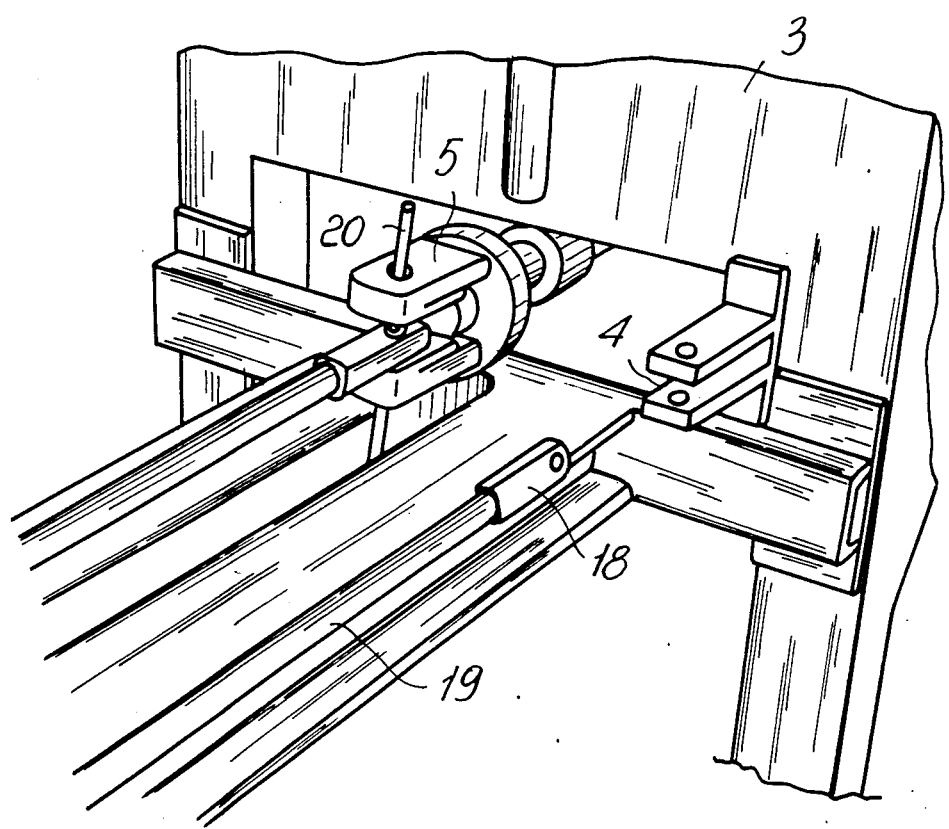
FIG. 5 is a perspective view of one of the two headers positioned at the ends of the said bed.

Referring now to the drawings there is shown combined apparatus for the unbinding and removal of rubber tubes made on metal cores, after vulcanisation thereof, comprising a bed, generally indicated 1 constituted by a plurality of supporting structures 2 disposed in longitudinal sequence between two headers 3 each provided with a pair of connector forks, one, the fork 4, of which is fixed and the other, the fork 5, of which is capable of rotation.

At the two ends of the said structure there are positioned corresponding drums 6 with horizontal axes, one of which is driven by means of a geared motor 7, whilst the other is provided with a tensioner device 8. Over the said pair of drums passes an endless belt supported at regular intervals by freely rotatable rollers 10 and suitably maintained in tension by the above-mentioned tensioner device.

Along one of the sides of the said bed, moreover, there is positioned, at ground level, a rail 11 along which a carriage 13 can roll by means of corresponding pairs of rollers 12 mounted on one side thereof, the carriage 13 being supported on the opposite side by rubber-tired wheels 14. This carriage is provided with a suitable spool 15 driven to rotate by a motor 22 via a transmission mechanism 21 which includes a slipping clutch for enabling the spool 15 to maintain a slight tension on the bandage or strip 16 without damaging it. The bandage or strip 16 which clads the tube can thus be wound back in an orderly fashion. This arrangement permits tubes of all diameters to be unwrapped at any speed. More precisely, the said spool is driven, via a suitable transmission member such as a slipping clutch, by a motor, whilst the movement of the carriage along the said rail 11 can be regulated continuously by an operator conveniently mounted on the carriage itself.

The operator can adjust the speed and the winding tension in such a way as to be able to wind onto the spool 15 any type of cord, bandage or strip at any withdrawal angle. In practice, the said unbinding operation is effected by depositing a vulcanised tube 17 on a core 19, onto the bed 1 (obviously with the conveyor belts stopped) and then fixing the ends 18 of the metal core 19 to the rotary fork 5 of the header 3 by means of a pin 20. For this purpose the ends 18 of the core 19 are suitably shaped and provided with a transverse aperture for receiving the pin 20.

Subsequently, the operator engages one end of the strip or bandage onto the spool 15 and puts the spool itself into rotation whilst arranging to move the carriage at a speed which is a function of the unwinding velocity of the strip or bandage itself.

After it has been unwrapped the tube 17 is removed from the associated core by fixing one end of this latter into the fixed fork 4 of one of the said headers 3 and then putting into operation the conveyor belts 9, first of all slowly and then with a gradually increasing speed; these belts, by sliding in contact with the tube 17 and having a surface able to exert a convenient frictional force on the tube itself, cause its progressive separation from the core. This separation can be facilitated by means of an adequate introduction of compressed air between the tube and the core itself.

What is claimed is:

1. Combined apparatus for the unwrapping the bindings from a rubber tube formed on a metal core after vulcanisation thereof, and for removal of said rubber tube from said core, comprising:

a bed constituted by a plurality of conveyor belts arranged in series in a horizontal plane, header means at each end of said bed, carriage means movable along one side of said bed, a spool carried by said carriage, a drive motor for driving said spool, transmission means interconnecting said drive motor and said spool, said transmission means including slip means allowing slippage of the drive to said spool.

2. The combined apparatus of claim 1, wherein the said bed is formed by a plurality of supporting structures disposed in longitudinal sequence between two said header means, connector fork means on each said header, said connector fork means comprising a first fork which is fixed to the associated said header means and a second fork which is rotatable about a horizontal axis, means for connecting said first fork of said connector fork means to the core of a tube carrying a binding to be unwrapped thereon, and means for connecting said second connector fork means to the core of a tube to be separated therefrom.

3. The combined apparatus of claim 2, wherein each said supporting structure includes two drums with horizontal axes positioned at each end of said supporting structure, an endless conveyor belt passing over said drums, a geared motor drivingly connected to one of said drums, and a tensioner device for tensioning said endless conveyor belt carried on the other of said drums.

4. The combined apparatus of claim 1 wherein a rail is located on one side of the said bed at ground level, said carriage means being carried on said rail by means of corresponding pairs of rollers mounted on one side thereof, the carriage (13) being further supported at its side opposite said pairs of rollers by rubber-tired wheels.

5. The combined apparatus of claim 1, wherein said drive motor for driving said spool is a slipping motor and the movement of said carriage can be continuously controlled by an operator conveniently positioned on said carriage itself whereby to control the speed of said carriage in such a way as to be able to wind onto said spool of any type of binding at any angle at which it may be wrapped on said tube.

6. The combined apparatus of claim 1, wherein said conveyor belts have frictional surfaces for contacting a rubber tube lying thereon so that removal of a tube from its core after it has been unwrapped can be achieved by fixing one end of said core into said second fork of said fork means and then putting said conveyor belts into operation, first of all slowly and subsequently with gradually increasing speed, so that said conveyor belts, by sliding in contact with said tube exert a frictional force thereon to cause progressive withdrawal of said tube from the core.

* * * * *